United States Patent [19]

Muller et al.

[11] 3,954,716

[45] May 4, 1976

[54] PROCESS FOR THE PREPARATION OF POLYESTERS

[75] Inventors: Erwin Müller; Normann Joop, both of Leverkusen, Germany

[73] Assignee: Bayer Aktiengesellschaft, Leverkusen, Germany

[22] Filed: Nov. 12, 1974

[21] Appl. No.: 523,093

Related U.S. Application Data

[63] Continuation of Ser. No. 283,677, Aug. 25, 1972, abandoned.

[30] Foreign Application Priority Data

Sept. 8, 1971 Germany.............................. 2144874

[52] U.S. Cl. ............................. 260/75 R; 260/75 T; 260/485 G; 260/873; 526/225; 526/321

[51] Int. Cl.² ......................................... C08G 63/42

[58] Field of Search.......... 260/75 R, 78.4 R, 475 P, 260/485 G, 75 T

[56] References Cited

UNITED STATES PATENTS

| | | | |
|---|---|---|---|
| 3,225,014 | 12/1965 | D'Alelio.......................... | 260/78.4 R |
| 3,225,015 | 12/1965 | D'Alelio.......................... | 260/78.4 R |
| 3,644,484 | 2/1972 | Witt et al. ....................... | 260/475 P |
| 3,739,017 | 6/1973 | Reilly .............................. | 260/475 P |

FOREIGN PATENTS OR APPLICATIONS

| | | |
|---|---|---|
| 843,825 | 8/1960 | United Kingdom |
| 891,206 | 3/1962 | United Kingdom |
| 992,989 | 5/1965 | United Kingdom |
| 1,000,329 | 8/1965 | United Kingdom |
| 1,016,076 | 1/1966 | United Kingdom |

Primary Examiner—John C. Bleutge
Assistant Examiner—W. C. Danison, Jr.
Attorney, Agent, or Firm—Joseph C. Gil; Gene Harsh

[57] ABSTRACT

High molecular weight polyesters are prepared by reacting cyclic acetals or ketals with carboxylic acids or low molecular weight carboxyl terminated polyesters while avoiding the necessity of removing by-products of condensation such as water or alcohols. The polyesters of the invention are useful in the polyisocyanate polyaddition process or as plasticizers for polyvinylchloride and other synthetic resins.

5 Claims, No Drawings

PROCESS FOR THE PREPARATION OF POLYESTERS

This is a continuation of application Ser. No. 283,677, filed Aug. 25, 1972, now abandoned.

Most of the known processes for the preparation of polyesters consist of condensation reactions of glycols with dicarboxylic acids or their esters, in which water or alcohols are eliminated and polyesters with various molecular weights are obtained. The molecular weight depends both on the conditions under which the condensation is carried out and on the structural components of the polyester. To obtain higher or high molecular weight polyesters having a molecular weight above 3000 by the known condensation process, complete removal of eliminated components such as water or alcohols, is necessary in order to displace the reaction equilibrium in favor of polyester formation. This can be achieved either by azeotropic condensation in the presence of solvents at normal pressure or by condensation in the melt under a very high vacuum (see Houben-Weyl, Volume 14/2, page 2). Both of these methods involve considerable technical expenditure and require the use of special apparatus (see W. H. Carothers and J. W. Hill, Ann. Soc. 54, 1557 (1932)).

The preparation of higher and high molecular weight polyesters is also particularly difficult if the structural components of the polyesters are unstable at elevated temperatures or are liable to cause rupture of the molecular chain due to side reactions under the esterification conditions employed. An example of a structural component which has this effect is adipic acid, which is liable to be converted into cyclopentanone monocarboxylic acid by "Dieckmann condensation" and thereby bring about chain rupture, rendering difficult the preparation of higher or high molecular weight adipic acid polyesters. These disadvantages of the known esterification processes are obviated by the invention.

It is therefore an object of this invention to provide an improved process for the preparation of polyesters while avoiding the foregoing difficulties. Another object of this invention is to provide for the preparation of polyesters which are useful as plasticizers for polyvinyl chloride and similar resins by a more economical process.

These objects are accomplished by providing a process for the preparation of polyesters from compounds which have at least two carboxyl groups, or anhydrides of these compounds, with compounds which synthesize ester groups, characterized in that the compounds used for synthesizing the ester groups are cyclic acetals and-/or ketals.

When using adipic acid (as the dicarboxylic acid) and 1,4-dioxaspiro-4,5-decane (as the ketal), for example, the reaction according to the invention proceeds according to the following equation:

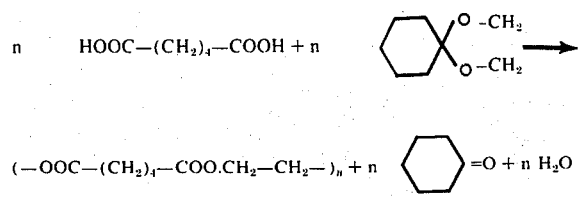

$n$ = e.g. 10–100, preferably 20–50.

When dicarboxylic acid anhydrides are used instead of dicarboxylic acids, no water is eliminated in the reaction. The process according to the invention, which is preferably carried out in the presence of catalytic quantities of known esterification or ester interchange catalysts, as more fully set out below, preferably p-toluenesulphonic acid, is surprising in that cyclic ketals and acetals are normally relatively stable to acids. Thus, for example, spirane derivatives such as

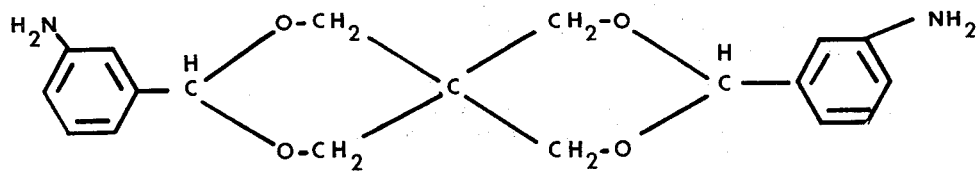

are not decomposed even under phosgenating conditions, i.e. in the presence of hydrogen chloride, even at 130°C. (see E. Muller, H. Wilmer, H. Kritzler, K. Wagner, German Pat. No. 1,240,875 (1960) and the above-mentioned 1,4-dioxyspiro-[4,5]-decane can only be cleaved by molar quantities of anhydrous aluminum chloride (see Organic Synthesis Volume 97, page 37). It is all the more astonishing that under the conditions according to the invention, cleavage of the cyclic acetals or ketals with elimination of the corresponding aldehydes or ketones by distillation will take place in the presence of catalytic quantities of acids at temperatures of 130°C.

While we do not wish to be limited to any particular theory with regard to the invention, the following may help in understanding the exceptional process. The fact that this reaction will take place under conditions which are exceptionally mild for the preparation of polyesters is presumably due to the fact that cleavage of the cyclic acetals or ketals proceeds via the reactive intermediate stage of the semiacetal.

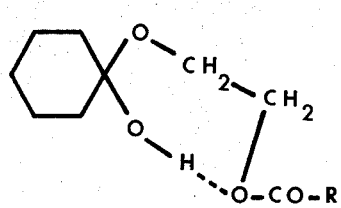

The cyclic acetals or ketals used according to the invention therefore react much more readily with carboxyl groups than do glycols or alkylene oxides. The carboxyl groups which are still present in small concentration after a substantial amount of condensation has taken place will therefore also be included in the reaction to form the higher molecular weight polyesters.

This process enables polyesters with hydroxyl or acid numbers below 10 and molecular weights above 10,000, preferably acid numbers in the range of 0 to 10, to be prepared under the usual conditions, but employing suitable quantitative proportions it is also possible to prepare products with low molecular weights (e.g. 2000) where this is desired. In the process according to the invention, at least one mol of cyclic acetal or ketal group is used per two mols of carboxyl groups. The quantity of cyclic acetals and ketals used is normally about 10 to 50% by weight greater than that calculated for the quantity of carboxyl or anhydride groups present.

The compounds with at least two carboxylic acid groups and preferably 2 to 3 carboxylic acid groups, used for this process may be known aliphatic and aromatic polycarboxylic acids or their anhydrides. Suitable aliphatic polycarboxylic acids are, for example, succinic acid, maleic acid, fumaric acid, glutaric acid, adipic acid, sebacic acid, azelaic acid and 1,2,4-hexane tricarboxylic acid. Suitable aromatic polycarboxylic acids are for example, phthalic acid, isophthalic acid, terephthalic acid, trimellitic acid and pyromellitic acid, as well as their anhydrides. Polyesters which contain carboxyl groups are also particularly suitable starting materials for the process according to the invention. These carboxyl-group-containing polyesters, which may be prepared either by known methods, e.g. by the esterification of glycols with excess dicarboxylic acid or by the process according to the invention preferably contain carboxyl end groups. They are then reacted with the cyclic acetals or ketals, the acid number then approaching zero. The following are mentioned as examples of polyesters containing carboxyl groups which have an acid number of about 50 to 200 and a hydroxyl number approaching zero:

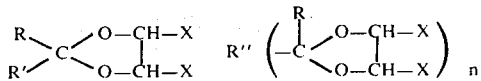

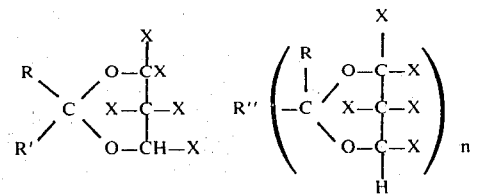

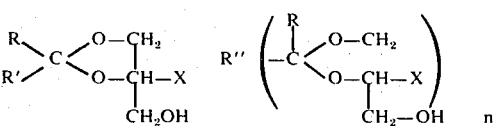

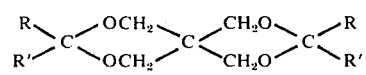

in which R and R' may be the same or different and represent hydrogen, $C_1$–$C_{18}$ alkyl, $C_4$–$C_{14}$ cycloalkyl or $C_6$–$C_{14}$ aryl, or R and R' taken together represent a $C_4$–$C_7$ cycloalkylene radical, R'' represents an n-valent aliphatic radical having 1–18 carbon atoms, a cycloaliphatic radical having 4–14 carbon atoms or an aromatic radical having 6–14 carbon atoms, $n = 2$ or 3 and X represents a hydrogen atom, a $C_1$–$C_{18}$ alkyl or $C_2$14 $C_{18}$ alkenyl radical.

Some of the acetals or ketals to be used according to

| | |
|---|---|
| Polyester of ethylene glycol and adipic acid | Acid number 56 OH number 0 |
| Polyester of butane-1,4-diol and adipic acid | Acid number 52 OH number 0 |
| Polyester of hexane-1,6-diol and adipic acid | Acid number 62 OH number 0 |
| Polyester of 2-dimethyl-1,3-propanediol and adipic acid | Acid number 64 OH number 0 |
| Polyester of hexane-1,6-diol, 2-dimethyl-propane-1,3-diol (Molar ratio 2:1) and adipic acid | Acid number 59 OH number 0 |
| Polyester of ethylene glycol and phthalic acid | Acid number 64 OH number 0 |
| Polyester of ethylene glycol and terephthalic acid | Acid number 56 OH number 0. |

Aliphatic and aromatic polycarbonates having carboxyl end groups may also be used according to the invention.

In the process according to the invention, the dicarboxylic acids or their anhydrides are reacted with cyclic acetals or ketals. The cyclic acetals are preferably compounds of the following formulae:

the invention are known in the literature and may be prepared in known manner by condensing aldehydes or ketones with 1,2-glycols or 1,3-glycols, e.g. in the presence of catalytic quantities of p-toluenesulphonic acid (see E. J. Salmi, B.71, 1806 (1938)).

The following compounds are mentioned as examples:

a) 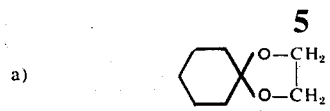 Boiling point 65–67°C (13 mmHg)
b) 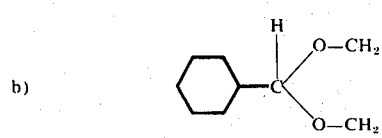 Boiling point 69–70°C (0.05 mmHg)
c) 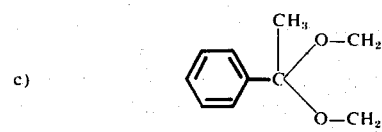 Boiling point 56–60°C (0.01 mmHg)
Melting point 54°C
d)  Boiling point 57°C (18 mmHg)
e) 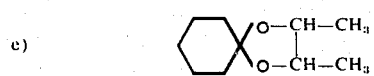 Boiling point 84°C (18 mmHg)
f) 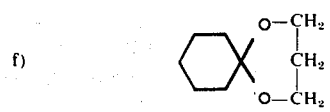 Boiling point 91°C (18 mmHg)
g) 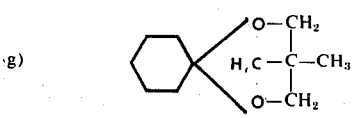 Boiling point 94°C (15 mmHg)
h) 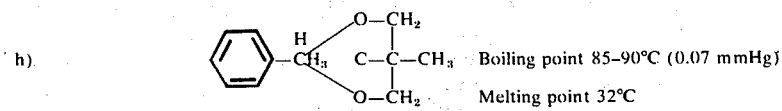 Boiling point 85–90°C (0.07 mmHg)
Melting point 32°C
i) 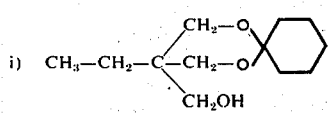 Boiling point 130–135°C (0.1 mmHg)
Melting point 42–45°C
j) 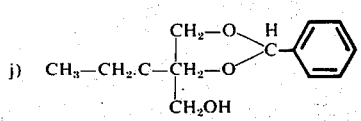 Boiling point 135–139°C (0.02 mmHg)
Melting point 51°C
k) 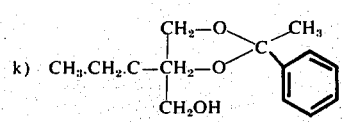 Boiling point 136°C (0.1 mmHg)
Melting point 75°C
l) 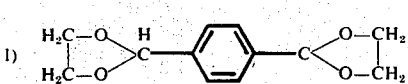 Melting point 80°C The following may also be used according to the invention:

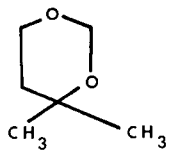
4,4-dimethyl-1,3-dioxane

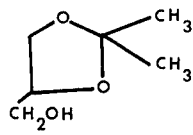
2,2-dimethyl-4-hydroxymethyl-1,3-dioxolane

The following are examples of 1,3-glycols which may be used for the preparation of the cyclic acetals or ketals:

2-Methylpentane-2,4-diol

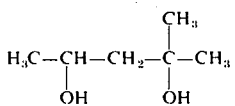

3-Methylpentane-2,4-diol

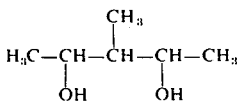

Butane-1,3-diol

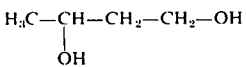

2-Methyl-2-propyl-propane-1,3-diol

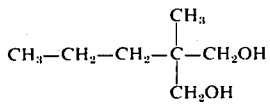

2,2-Diethyl-propane-1,3-diol

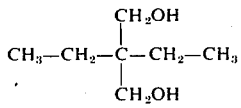

2-Ethyl-hexane-1,3-diol

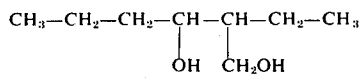

2-Methylene-propane-1,3-diol

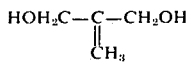

is an example of 1,3-glycol with alkylene group.

Ketals and acetals which contain free hydroxyl groups are also of particular interest. When these compounds are reacted with dicarboxylic acids or their anhydrides, the reaction preferentially takes place with the hydroxyl groups which are blocked as acetal or ketal groups so that the products produced are predominantly linear higher molecular weight polyesters which have hydroxyl groups distributed along the chain.

The process according to the invention may be carried out in conventional technical apparatus.

The reaction of cyclic acetals or ketals with compounds which contain carboxyl groups or anhydride groups is generally carried out in the melt and in the presence of esterification or ester interchange catalysts. It may be carried out e.g. under a stream of inert gas such as carbon dioxide or nitrogen at temperatures of about 130° to 220°C, initially at atmospheric pressure so that the aldehydes or ketones from which the cyclic acetals or ketals are derived distil off together with water. The remaining volatile components which are capable of being eliminated are then advantageously removed under vacuum (water pump), acid numbers and hydroxyl numbers below 10 being obtained. The resulting higher molecular weight polyesters, some of which are known, have a waxy or horny consistency depending on the structural components used and may be used e.g. as starting components for the isocyanate polyaddition process or as plasticizers for polyvinyl chloride and other synthetic resins.

One of the most suitable esterification or ester interchange catalysts is p-toluenesulphonic acid, which is used in quantities of about 0.1% based on the quantity of reaction mixture, but other conventional ester interchange catalysts may also be used, e.g. titanium tetrabutyl oxide, mineral acids such as hydrogen halides, phosphoric acid, phosphorous acid, benzene disulphonic acid, dichloride or the catalysts mentioned in Houben Weyl Volume 14/2 on page 13.

EXAMPLE 1 a. Preparation of 1,4-dioxaspiro-4,5-decane (starting material)

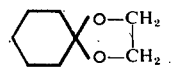

A solution of 1.18 kg (12 mol) of cyclohexanone,
820.0 g of ethylene glycol (13.2 mol)
0.5 g of p-toluenesulphonic acid and
2.5 l of benzene
is boiled under reflux until no more water separates. When 220 g of water have been removed azeotropically, benzene is evaporated off under vacuum and the residue is distilled. Boiling point 65°–67°C/13 mm. Yield 1.41 kg = 83% of the theory.

The other cyclic acetals and ketals mentioned in the description were obtained in analogous manner.

b. Process according to the invention

Preparation of polyethylene adipate of adipic acid and 1,4-dioxaspiro-4,5-decane.

73 g of adipic acid (0.5 mol) and
142 g of 1,4-dioxaspiro-4,5-decane (1 mol)
were heated to 170°C in a three-necked stirrer apparatus with descending cooler after the addition of 0.1 g of p-toluenesulphonic acid under a stream of carbon dioxide. 9 g of water and 50 g of cyclohexanone were eliminated on heating for 6 hours at a temperature of 175° to 200°C. A further 50 g of distillate were removed under a pressure of 12 mmHg at 220°C. The fractionation of this distillate yielded 25 g of a product of the following constitution which distilled over at 110°–116°C/0.2 mmHg:

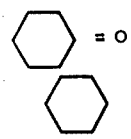

C$_{12}$H$_{18}$O Molecular weight 178

Calculated: C, 80.8; H, 10.1; O, 9.0.
Found: C, 80.4; H, 10.4; O, 9.4.

The polyester remaining is a pale, impact resistant wax having a softening point of 50°C, the highly viscous melt of which can be drawn out into threads.

| OH number | 8.6 |
|---|---|
| acid number | 2.4 |

EXAMPLE 2

Polyethylenephthalate

When 74 g of phthalic acid anhydride (0.5 mol) are reacted with 112.5 g (0.75 mol) of the following compound

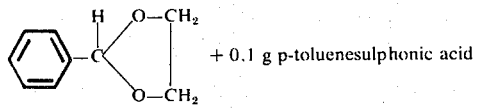 + 0.1 g p-toluenesulphonic acid (known, see B. 71, 1806)
under the conditions described in Example 1 b, 24 g of benzaldehyde are distilled off on heating for 16 hours at temperatures of up to 220°C. The acid number is 27. Thereafter, 28 g of a mixture of benzaldehyde and excesss acetal are distilled off on maintaining the reaction mixture at 220°C and a pressure of 12 mm Hg for 10 hours.

B. = Berichte der Deutschen Chemischen Gesellschaft 106 g of a pale yellow, brittle resin is obtained which becomes soft again when heated and has an acid number of 10 and an OH number = 0.

EXAMPLE 3

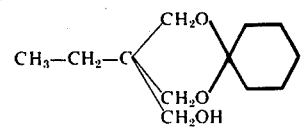

(known, see B. 71, 1806)
and 0.1 g of p-toluene sulphonic acid are reacted together under the conditions described in Example 1 (b). 11 g of water and 55 g of cyclohexanone are eliminated on heating for 5 hours at a temperature of 175°–220°C. A further 30 g of cyclohexanone are then distilled off at 140° to 220°C/12 mmHg.

The residue is a highly viscous yellow oil which has an acid number of 1.09 and an OH number of 124. Yield: 200 g.

A similar product is obtained when the compound

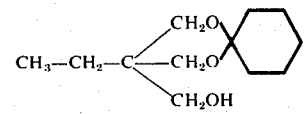

is replaced by 220 g of the compound

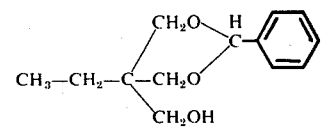

(known, see B. 71, 1806)
and the reaction is carried out under the same conditions and with the same proportions of reactants.

EXAMPLE 4

Polyethylene adipate of polyethyleneadipate acid number 67; OH number 0 and 1,4-dioxaspiro-4,5-decane

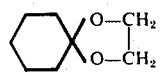

200 g of polyethylene adipate (acid number 67, OH number 0) and 70 g of dioxaspiro-4,5-decane and 0.2 g of p-toluene-sulphonic acid are reacted together under the conditions indicated in Example 1 (b). 45 g of cyclohexanone are eliminated on heating for 11 hours at temperatures of up to 215°C/ 760 mm. The acid number is only 1.9. Excess dioxaspiro-4,5-decane is then distilled off at 210°C/12 mm.

The polyester remaining is a pale, impact-resistant product having a softening point of about 42°C, an acid number of 1.3 and an OH number of 9.6.

a. If p-toluenesulphonic acid is replaced by 2 drops of 90% phosphoric acid and reaction is carried out under the same conditions and with the same proportions, the product obtained is an impact-resistant polyester which melts at 47°C and can be drawn out into threads and which has the OH number 0 and acid number 2.6.

b. If 3 drops of concentrated HCl are used instead of p-toluenesulphonic acid as catalyst, the product obtained is a polyester with OH number 5 and acid number 4, which melts at 45°C.

EXAMPLE 5

200 g of a polyester of adipic acid and 1,6-hexanediol having an acid number of 62 and OH number of 0 are reacted with 70 g of dioxaspiro-4,5-decane and 0.2 g of p-toluenesulphonic acid under the conditions indicated in Example 4. A mixture of about 60 g of cyclohexanone, water and excess dioxaspiro-4,5-decane is distilled off in the course of 18 hours at 215°C/12 mm. An impact-resistant, pale product having a softening point of 45°C, OH number 9.4 and acid number 1 is obtained.

EXAMPLE 6

200 g of a polyester of adipic acid, 1,6-hexanediol and neopentyl glycol (molar ratio of 1,6-hexanediol to neopentyl glycol 2 : 1) having an acid number 59 and an OH number 0 are reacted with 70 g of 1,4-dioxaspiro-4,5-decane and 0.2 g of p-toluenesulphonic acid under the conditions indicated above. 11 g of cyclohexanone are eliminated on heating for 11 hours at 180° to 210°C. The acid number is 3.1. 49 g of a mixture of a small amount of water, cyclohexanone and excess 1,4-dioxaspiro-4,5-decane are then distilled off at 210°C/12 mm.

The polyester obtained is a highly viscous oil having OH number 2.65 and acid number 0.25.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of a polyester with a molecular weight above 10,000 which comprises the step of heating to a temperature of 130°–220°C a mixture consisting essentially of an aliphatic or carbocyclic aromatic polyester having only two free carboxylic acid groups and having an acid number of from about 50 to about 200 and a cyclic ether selected from the group consisting of:

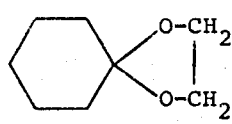

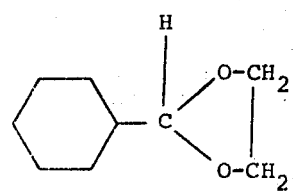

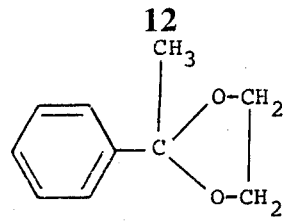

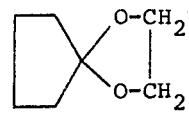

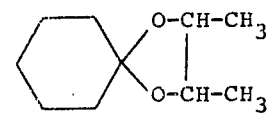

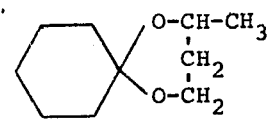

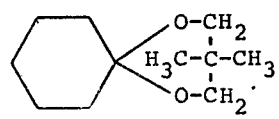

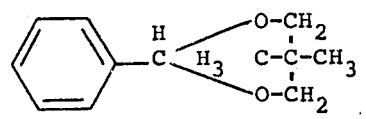

2. The process of claim 1 wherein said reaction is carried out in the presence of a catalytic amount of an esterification or ester interchange catalyst.

3. The process of claim 2 wherein said catalyst is p-toluenesulphonic acid.

4. The process of claim 1 wherein said reaction is carried out in the melt.

5. The process of claim 1 wherein said reaction is carried out; in a stream of gas which is inert to the reactants.

* * * * *